US006583891B2

(12) United States Patent
Joyce

(10) Patent No.: US 6,583,891 B2
(45) Date of Patent: Jun. 24, 2003

(54) SYSTEMS AND METHODS OF ESTIMATING SHEET SUPPLIES IN A PRINTING SYSTEM

(75) Inventor: David G. Joyce, Newmarket (CA)

(73) Assignee: Xerox Corporation, Stamford, CT (US)

( * ) Notice: Subject to any disclaimer, the term of this patent is extended or adjusted under 35 U.S.C. 154(b) by 297 days.

(21) Appl. No.: 09/725,225

(22) Filed: Nov. 29, 2000

(65) Prior Publication Data

US 2002/0063883 A1 May 30, 2002

(51) Int. Cl.[7] ................................................ G06K 15/00
(52) U.S. Cl. ..................... 358/1.18; 358/1.15; 358/1.12
(58) Field of Search ......................... 358/1.3, 1.5, 1.12, 358/1.18, 406, 471

(56) References Cited

U.S. PATENT DOCUMENTS

| | | | | |
|---|---|---|---|---|
| 4,976,421 A | * | 12/1990 | Kanaya | 271/258 |
| 5,033,731 A | * | 7/1991 | Looney | 271/176 |
| 5,078,378 A | * | 1/1992 | Kapadia | 271/3.1 |
| 5,342,036 A | * | 8/1994 | Golicz | 271/3.1 |

FOREIGN PATENT DOCUMENTS

| | | | | |
|---|---|---|---|---|
| EP | 0798246 | * | 1/1997 | B65H/1/18 |
| JP | 2000038248 | * | 2/2000 | B65H/31/18 |

* cited by examiner

*Primary Examiner*—Jerome Grant, II
(74) *Attorney, Agent, or Firm*—Oliff & Berridge, PLC

(57) ABSTRACT

Systems and methods for estimating a copy sheet supply in a printer. An exemplary system monitors mechanical motion in the normal operation of a printer to perform an initial estimate. After additional monitoring, the exemplary system may refine the initial estimate. An advantage of the exemplary system is ease of implementation with relatively few, or no, dedicated mechanical parts.

13 Claims, 5 Drawing Sheets

7

CENTRAL PRINTER HAS AN ESTIMATED 175 SHEETS REMAINING IN THE HIGH CAPACITY FEEDER.

FIG. 4

36

| SHEETS TYPE | SHEETS IN FULL TRAY |
|---|---|
| 16 POUND | 2450 |
| 20 POUND | 2000 |
| 32 POUND | 1400 |

FIG. 5

42

| SHEETS/ELEVATION CYCLE | SHEETS TYPE |
|---|---|
| 18 | 16 POUND |
| 12 | 20 POUND |
| 8 | 32 POUND |

FIG. 6

SYSTEMS AND METHODS OF ESTIMATING SHEET SUPPLIES IN A PRINTING SYSTEM

BACKGROUND OF THE INVENTION

1. Field of the Invention

This invention relates generally to printing systems and, more particularly, to systems and methods of estimating sheet supplies in a printing system.

2. Description of Related Art

Printers typically include one or more copy sheet trays that can be replenished by an operator from time to time. To facilitate a smooth operating routine, it is helpful to replenish the copy sheet supply before the supply is exhausted, instead of allowing the supply to be exhausted during a print request.

SUMMARY OF THE INVENTION

It is an object of the present invention to provide systems and methods of estimating a copy sheet supply in a printer.

To achieve this and other objects of the present invention, a method for a printing system, the method comprises measuring a quantity to raise a platform from a first position and estimating a number of sheets on the platform in response to the measured quantity.

According to another aspect of the present invention, a printing system comprises a first member, the first member being configured to hold copy sheets; a second member; an actuator configured to move the first and second members relative to each other; a register that stores a quantity determined after operation of the actuator; and an estimator that estimates a number of copy sheets, responsive to the quantity.

According to yet another aspect of the present invention, a printing system comprises means for measuring a quantity to raise a platform from a first position, and means for estimating a number of sheets on the platform, responsive to the measured quantity.

BRIEF DESCRIPTION OF THE DRAWINGS

FIG. 4 is a screen displaying a result of a process performed in a preferred system.

FIG. 5 is a diagram of a table stored in the circuitry of FIG. 3.

FIG. 6 is a diagram of another table stored in the circuitry of FIG. 3.

The accompanying drawings which are incorporated in and which constitute a part of this specification, illustrate embodiments of the invention and, together with the description, explain the principles and advantages of the invention. Throughout the drawings, corresponding parts are labeled with corresponding reference numbers.

DESCRIPTION OF THE PREFERRED EMBODIMENTS

Figure 1:
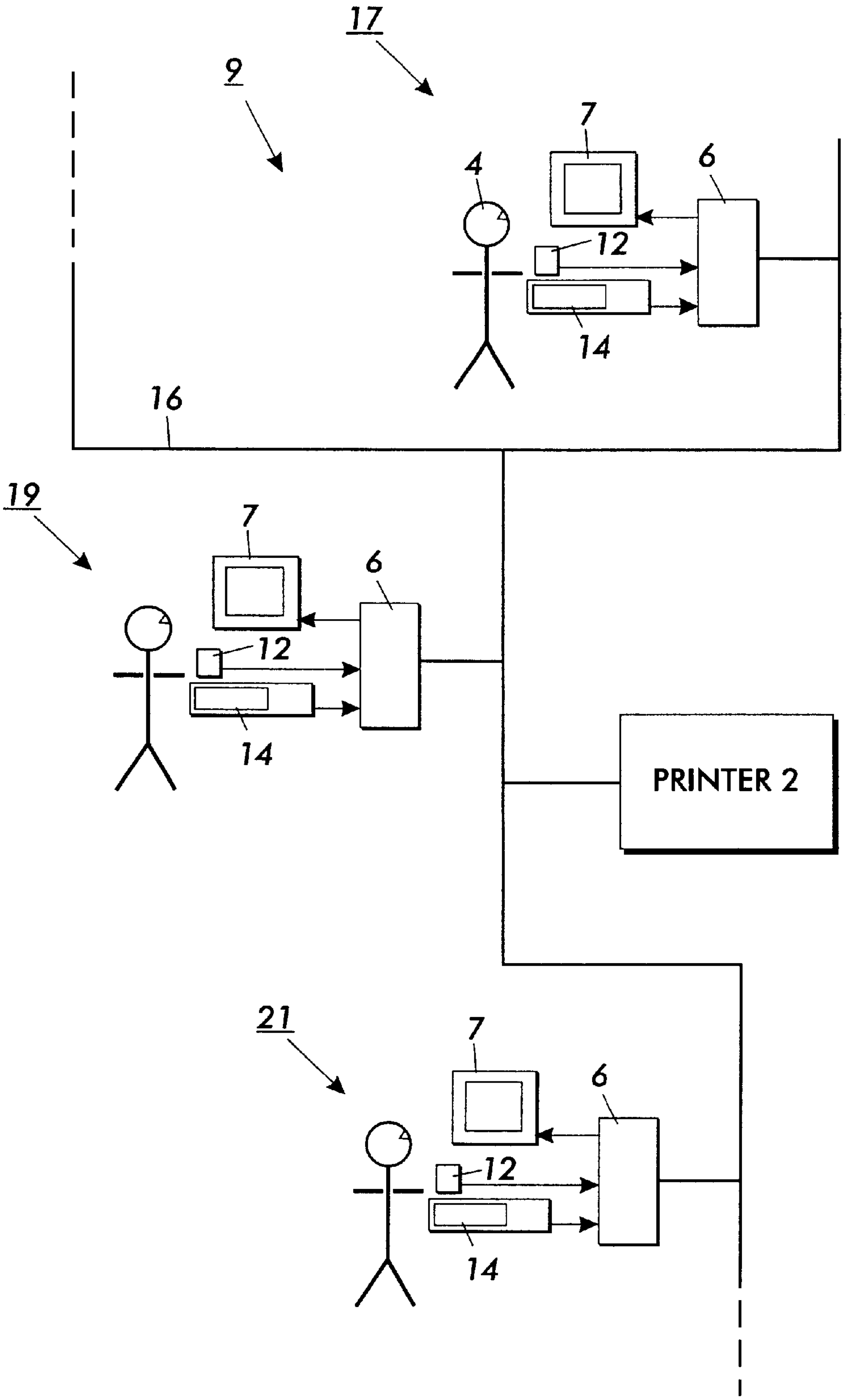
FIG. 1 is a diagram showing an overview of a preferred system.

FIG. 1 shows system 1 including printer 2 in computer network 9. Each of stations 17, 19, and 21 in network 9 sends print requests to printer 2 via local area network (LAN) cable 16. Printer 2 generates status information including an estimate of a copy sheet supply. Each of stations 17, 19 and 21 receives status information from printer 2 and displays the received status information on CRT display 7.

Each of stations 17, 19 and 21 includes a respective CRT display 7, mouse input device 12, keyboard 14, and station circuitry 6. Station circuitry 6 includes a general purpose central processing unit (CPU) executing programs in a random access memory, non-volatile disk storage, and a network interface card. In this disclosure, the term circuitry encompasses both dedicated hardware and programmable hardware, such as a CPU or reconfigurable logic array, in combination with programming data, such as sequentially fetched CPU instructions or programming data for a reconfigurable logic array.

Each of stations 17, 19, and 21 has a respective network address uniquely identifying the station in network 9. The network interface card in each station circuitry 6 recognizes when a packet containing the station's address is sent over cable 16, temporarily stores such a packet, and alerts the associated CPU when such a packet is recognized.

Figure 2:
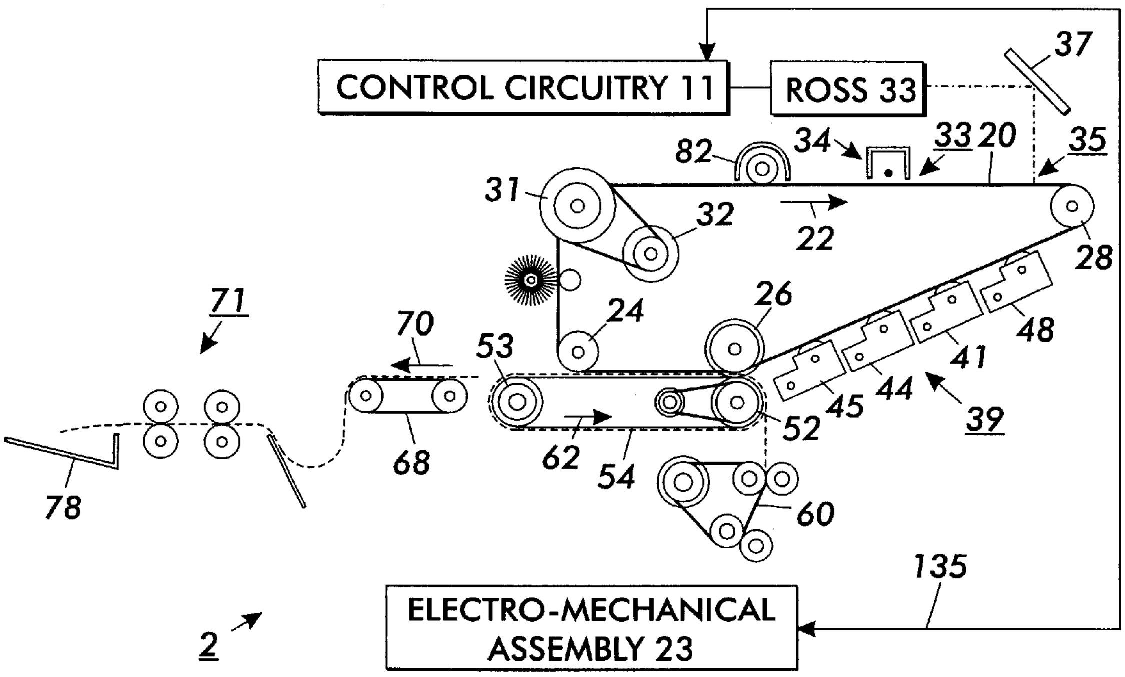
FIG. 2 is a diagram showing certain circuitry of FIG. 1 in more detail.

FIG. 2 shows printer 2 including bidirectional signal paths 135 between control circuitry 11 and electro-mechanical assembly 23. Control circuitry 11 receives print requests from LAN cable 16 and controls raster output scanner (ROS) 33 to record an image onto photoconductive belt 20. Control circuitry 11 also sends control signals to electro-mechanical assembly 23. Responsive to these control signals, electro-mechanical assembly 23 sends copy sheets from a paper tray into roller system 60. Roller system 60 transfers copy sheets onto belt 54.

Documents transmitted to circuitry 11 may also come from a scanner, tape, CD ROM, disk, etc.

Photoconductive belt 20 is entrained about rollers 24, 26, 28, and 31. Motor 32 rotates drive roller 31. As roller 31 rotates, roller 31 advances belt 20 in the direction of arrow 22, to advance successive portions of the photoconductive surface sequentially through the various processing stations. Initially, a portion of photoconductive belt 20 passes under corona generating device 34, to charge belt 20 to a relatively high, substantially uniform potential. Next, the charged photoconductive surface passes to an exposure station 35. Exposure station 35 receives a modulated light beam, via ROS 33 and mirror 37, that impinges on the surface of belt 20. The beam illuminates the charged portion of belt 20 to form an electrostatic latent image. The photoconductive belt is exposed three or more times to record three or more latent images thereon.

Developer units 48, 41, 44, and 45, respectively, apply toner particles of a specific color. Developer unit 48 applies magenta toner particles onto an electrostatic latent image recorded on belt 20. Similarly, developer unit 41 applies yellow toner particles. Developer unit 44 applies cyan toner particles. Developer unit 45 applies black toner particles.

As belts 54 move in the direction of arrow 62, a copy sheet moves into contact with the photoconductive belt, in synchronism with the toner image developed thereon. The sheet remains secured to the sheet gripper so as to move in a recirculating path for three of four cycles. In this way, three or four different color toner images are transferred to the sheet in superimposed registration with one another.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced to output tray 78 for subsequent removal by the machine operator.

Electro-mechanical assembly 23 sends a signal to control circuitry 11, allowing control circuitry 11 to estimate a supply of paper in assembly 23. Control circuitry 11 may then send signals to one of stations 17, 19, or 21 for display of a sheet estimate indication on CRT display 7.

Figure 3:
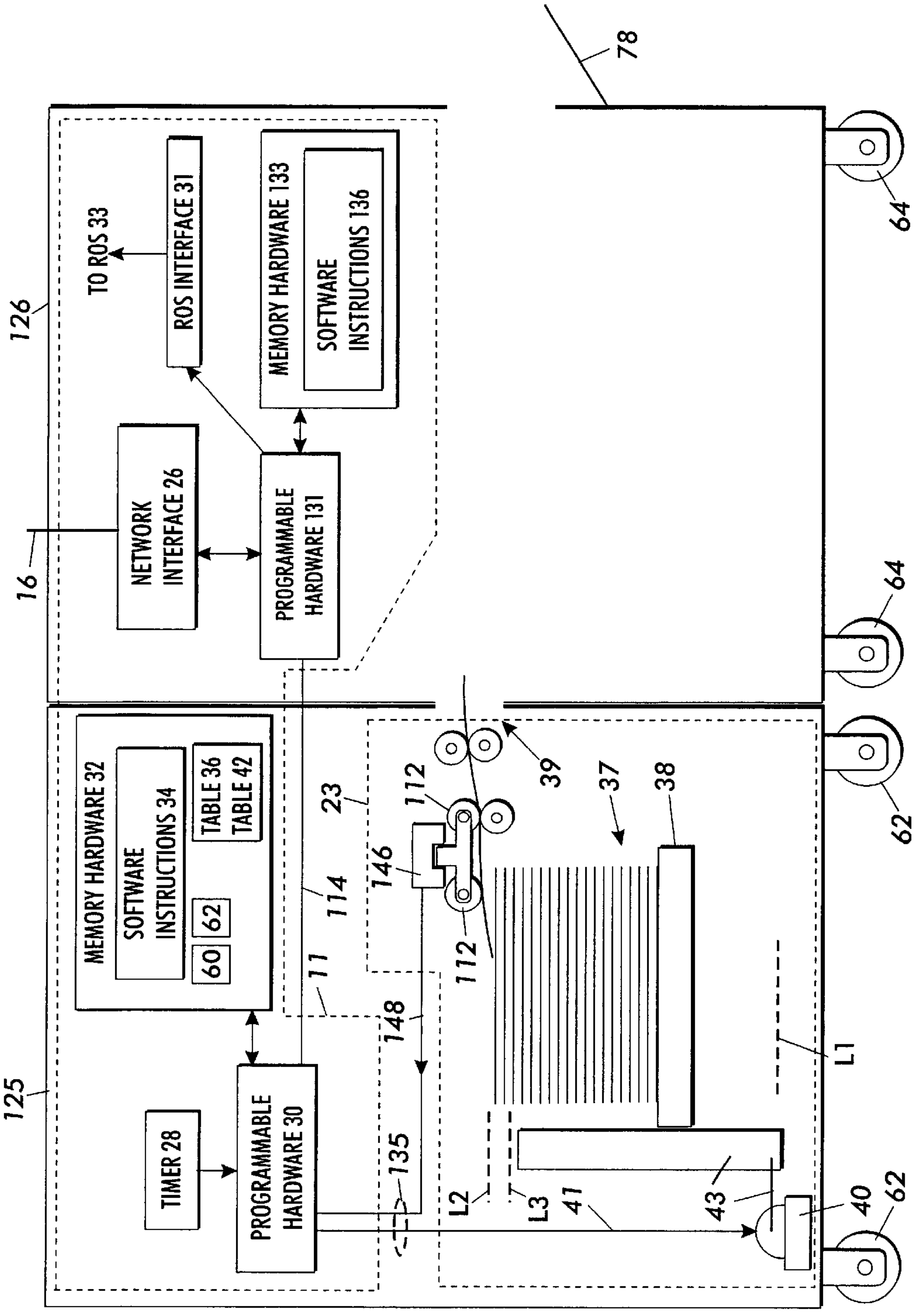
FIG. 3 is a diagram emphasizing the housings and certain aspects of the circuitry shown in FIG. 2.

FIG. 3 is a diagram of paper feed housing 125 and image output terminal (IOT) housing 126. In housing 126, network interface card 26 recognizes a network address uniquely identifying printer 2 in network 9. Programmable hardware 131 executes software instructions 136 in memory hardware 133. Hardware 131 and software instructions 136 act to receive user print request via network interface 26. Responsive to the received print request, hardware 131 controls ROS 33 via ROS interface circuitry 31. Responsive to the received print request, hardware 131 also sends control signals to paper feed housing 125 via signal paths 114.

Paper feed housing 125 encloses paper tray 38, motor 40 for raising tray 38, and stack height sensor 46 for detecting a position of copy sheets 37 on tray 38. Sensor 46 detects when the top of the stack of copy sheets 37 reaches position L3. Hardware 30 monitors a signal from sensor 46 and ceases to send power to motor 40 when sensor 46 indicates the top copy sheet is at level L3.

Timer 28 sends signals to programmable hardware 30 allowing programmable hardware 30 to measure an amount of time between 2 events. Timer 28 includes a clock signal generator that generates periodic timing signals.

Memory hardware 32 stores translation table 36, enabling hardware 30 to refine sheet estimates by compensating for thicknesses of various types of sheets.

Tray 38 is mounted on two slides attached to housing 38, enabling tray 38 to be loaded from the front.

Housing 125 is removably connected to image output terminal (IOT) housing 126. Housing 125, when fitted, will be positioned on the left-hand side of the IOT housing 126. Connection of housing 125 to housing 126 includes one connector containing both power and signal connections and a separate earth connection. Housing 125 includes wheels 62 for moving housing 125 across a surface. Housing 126 includes wheels 64 for moving housing 126 across a surface.

Paper stack 37 is carried on horizontal tray 38, which may hold a maximum of 2000 sheets of A4 or 8.5×11" 20 pound paper. Unidirectional DC motor 40 elevates stack 37 to feed position L2. Sensor 46 mounted to the feed head effectively reports a position of stack 37. Sensor 46 is operated by the pivoting mount of nudger rolls 112, which are lifted by paper stack 37 as stack 37 is elevated. Downward motion of tray 38 is controlled by a brake assembly once the drive is decoupled (drawer opened).

When the door to housing 125 is opened by an operator to replenish copy sheets 37, for example, an interlock switch opens, and an elevator drive shaft for tray 38 is decoupled from motor 40. Thus, tray 38 moves down via gravity to the position designated by the dotted line L1 in FIG. 3. Subsequently, when the housing 125 door is closed, the interlock switch closes. After a delay of 100 msec, if the stack height sensor 46 does not generate a signal, programmable hardware 30 places paper tray 38 in an operating position by sending power to motor 40, which raises paper tray 38 via mechanical linkages 43. When the rolls 112 are lifted into the feed position by the ascending paper stack 37, sensor 46 will generate the signal when stack 37 reaches L3, causing hardware 30 to deactivate motor 40 after a delay of 29 milliseconds. Because of inertia and the delay, stack 37 will stop its ascent at L2. Hardware 30 measures a time between first sending power to motor 40, to initiate the raising of tray 38 from L1, and receiving the signal from sensor 46 indicating L3 for stack 37. Hardware 30 stores this tray raise time into location 60 in memory hardware 32.

To effect a print request, hardware 30 sends a signal to a motor to eject the top copy sheet through exit port 39 toward sheet transport station 60. Sheets of paper are fed from the paper stack until nudger rolls 112 drop to the position L3 where stack height sensor 46 no longer generates the signal. In other words, as copy sheets are ejected, the level of the top of sheet stack 37 lowers until sensor 46 detects a level L3. Hardware 30 monitors a signal from sensor 46 and, in response to the detection of level L3, sends power to motor 40 for 63 milliseconds, to again raise the top of sheet stack 37 to level L2. Hardware 30 sends power for 63 milliseconds, instead of merely 29 milliseconds, because tray 38 has less upperward momentum at this point than when tray 38 is being raised from position L1.

Hardware 30 counts the number of sheets between achieving level L2 and lowering to level L3. Hardware 30 stores this sheet count into location 62 in memory hardware 32.

In other words, a short elevate cycle occurs during feeding when the height of paper stack 37, and therefore nudger rolls 112, drops to a level L3 where sensor 46 no longer generates a signal. Responsive to this absence of a signal, programmable hardware 30 disengages a paper feed clutch and activates motor 40 to raise tray 38.

Hardware 30 uses the number of sheets ejected since the raising of tray from level L1, the stored tray raise time in location 60, and the stored sheet count in location 62 to provide an estimate of the number of sheets in sheet stack 37.

Hardware 30 sends this estimate to CRT displays 7 via network interface 26. For example, as shown in FIG. 4 hardware 30 sends a sheet estimate signal to station 21 for display on CRT 7 of station 21.

A specific example of the sheet estimating process will now be described. In the exemplary system, 20 seconds is required to raise tray 38 from the L1 position to the L3 position when tray 38 has zero sheets, and 4 seconds is required to raise tray 38 from the L1 position to the L3 position when tray 38 is full to capacity. The number of sheets in a full tray will vary with the sheet type, as shown in table 36 in FIG. 5. Table 36 is essentially a mapping of sheet type to number of sheets in a full tray.

If the sheet type is known, the number of sheets in tray 38 is given by:

Number of sheets in tray 38=$(T_E-T_M)(F/(T_E-T_F))-N$

Where:

$T_E$=Time to raise an empty tray 38 from L1 to L3.

$T_F$=Time to raise a full tray 38 from L1 until top of stack 37 reaches L3.

$T_M$=Time measured for stack 37 to raise from L1 to L3.

F=Full tray capacity for a given weight of paper. See FIG. 5.

N=Number of sheets fed since raising tray 38 from L1.

To make an initial estimate about the number of sheets on tray 38, hardware 30 may use an assumed value for F. To make a more refined estimate, hardware 30 determines a value for F by counting the number of sheets fed between elevation cycles, and using this count to determine the sheet type as shown in Table 42 in FIG. 6. Table 42 is essentially a mapping of sheets per elevation cycle to sheet type.

Figure 7:
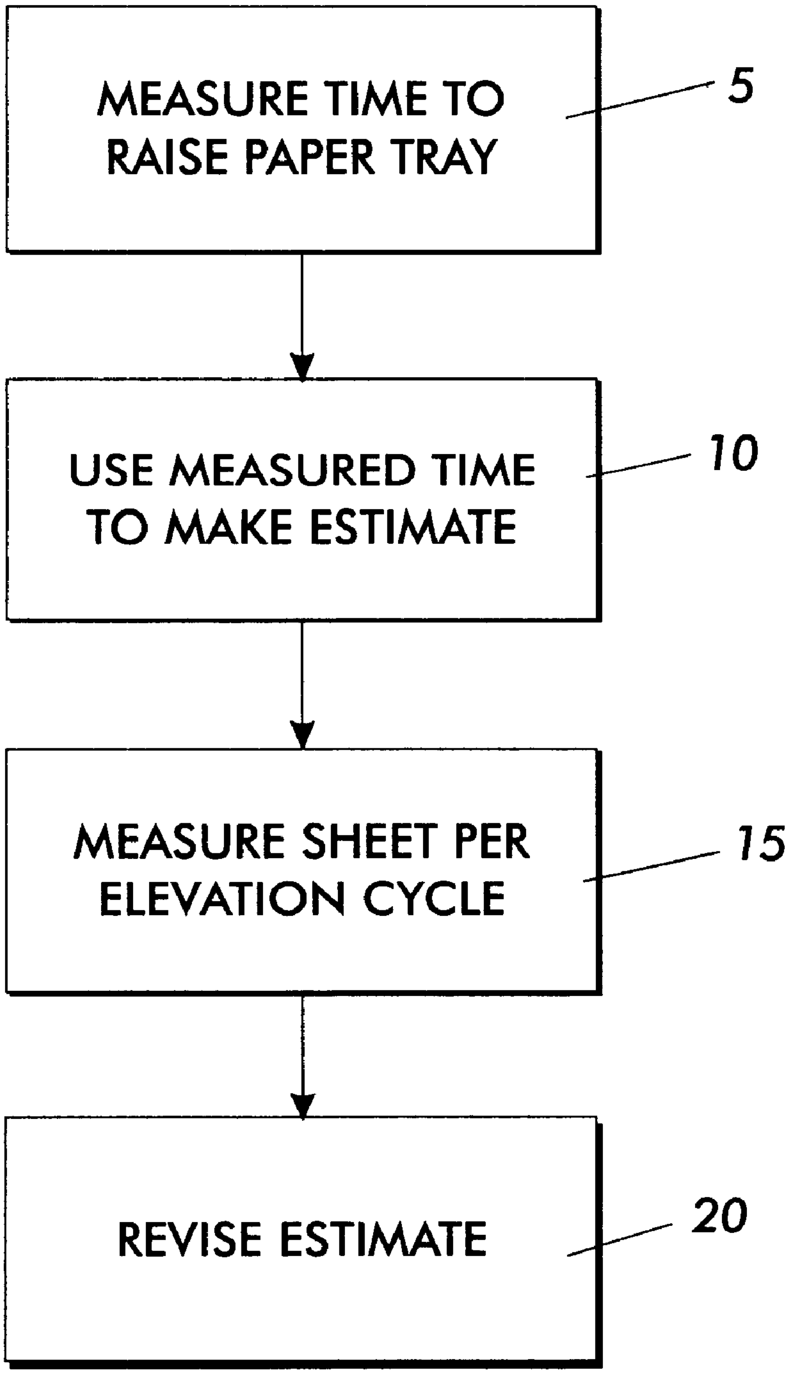
FIG. 7 is a flow chart of a process performed by a preferred system.

FIG. 7 shows a flow chart of a process performed by paper feed module 125. Module 125 measures a time to raise the copy sheet tray from the base level L1 to a top level L3. (Step 5). Hardware 30 makes an initial estimate based on this tray raise time. (Step 10). At the time of step 10, the sheet type may be assumed or unknown.

During a print request, module 125 measures the number of sheets ejected for each raising of tray 38 from level L3 to Level L2. (Step 15). Hardware 30 makes a more refined estimate based on the sheets per cycle measured in step 15. (Step 20).

Thus, the illustrated embodiments monitor limits of mechanical motion in the normal operation of a printer to perform an initial estimate. After additional monitoring, the illustrated embodiments may refine the initial estimate. An advantage of these particular embodiments is ease of implementation with relatively few, or no, dedicated mechanical parts.

Programable hardware 30 may include multiple CPUs. Alternately, hardware 30 may be a single CPU having various integrated functions. Similarly, memory hardware 32 may include multiple independent memories or may be an integrated memory.

Programable hardware 131 may include multiple CPUs. For example, hardware 131 may include a first CPU that executes instructions for interfacing with users, and a second CPU, that receives commands from the first CPU and controls feeder 125, or other electronic or mechanical functions, for example. Alternately, hardware 131 may be a single CPU having user interface functions integrated with hardware control functions. Similarly, memory hardware 133 may include multiple independent memories or may be an integrated memory.

Although the illustrated embodiments measure a time between raising of tray 38 from level L1 to L3, other measures of vertical distance may be employed. For example, if a stepper motor is employed to raise the paper tray, hardware 30 may count the number of pulses sent to the stepper motor to raise the tray from a bottom level to a top level.

Although a mechanical sensor 146 has been illustrated, alternate embodiments of the invention may employ other sensing mechanisms including multiple sensors or optical sensors.

Thus, the preferred systems provides an efficient mechanism for tracking the available number of copy sheets.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a printing system, the method comprising:

measuring a quantity to raise a platform from a first position;

counting a number of sheets between elevation cycles; and estimating a number of sheets on the platform in response to the measured quantity wherein the estimating includes using the counted number to estimate a number of sheets on the platform.

2. The method of claim 1 wherein the quantity includes a time.

3. The method of claim 1 further including displaying a signal in response to the estimating step.

4. The method of claim 1 wherein the quantity includes pulses.

5. The method of claim 1 wherein the printing system includes a network of computers, and the method further includes receiving print requests from a plurality of nodes in the network;

performing the received print requests; and sending a signal representing the estimated number of sheets to one of the nodes in the network.

6. The method of claim 5 wherein the quantity includes a time.

7. A printing system comprising:

a first member, the first member being configured to hold copy sheets;

a second member;

an actuator configured to move the first and second members relative to each other;

a register that stores a quantity determined after operation of the actuator an estimator that estimates a number of copy sheets in response to the quantity; and a counter that determines a number of sheets between elevation cycles, wherein the estimator is responsive to the counter.

8. The system of claim 7 further including a display that displays a signal responsive to the estimator.

9. The system of claim 7 further including an interface to a network of computers; and a sender that sends a signal representing the estimated number of copy sheets to one of the nodes in the network, via the interface.

10. A printing system comprising:

means for measuring a quantity to raise a platform from a first position;

means for counting a number of sheets between elevation cycles; and means for estimating a number of sheets on the platform in response to the measured quantity, the estimating means is responsive to the means for counting.

11. The system of claim 10 wherein the means for measuring includes a generator that generates periodic signals.

12. The system of claim 10 further including means for displaying a signal responsive to the estimating means.

13. The system of claim 10 further including means for receiving print requests from a plurality of nodes in the network;

means for performing the received print requests; and means for sending a signal representing the estimated number of sheets to one of the nodes in the network.

* * * * *